June 10, 1952   F. H. CAREY   2,599,609
HIGH-PRESSURE PUMP
Filed June 15, 1948
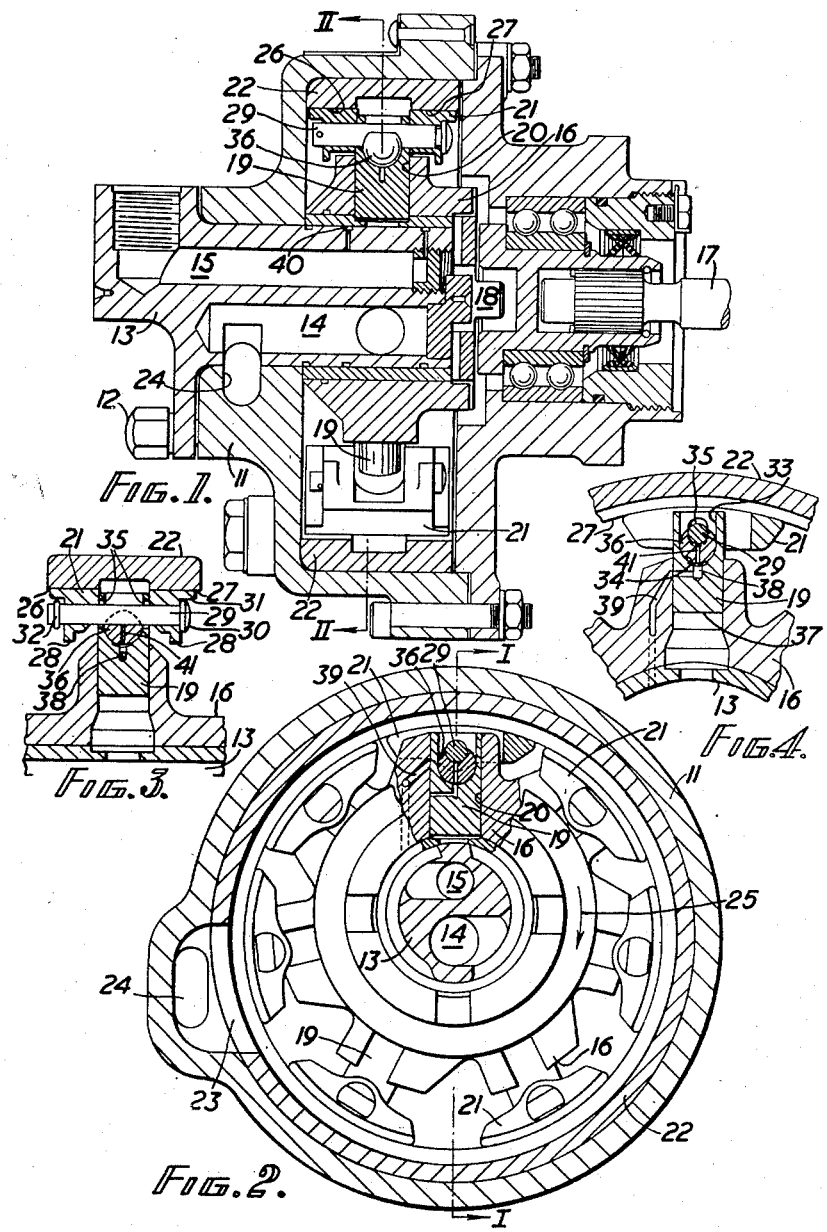
Inventor
FREDERICK H. CAREY
By Reynolds & Beach
Attorneys Patented June 10, 1952

2,599,609

UNITED STATES PATENT OFFICE 2,599,609

HIGH-PRESSURE PUMP

Frederick Henry Carey, Cheltenham, England, assignor to Dowty Equipment Limited, Cheltenham, England Application June 15, 1948, Serial No. 33,156
In Great Britain July 9, 1947

6 Claims. (Cl. 103—161)

This invention relates to high pressure pumps in which a rotatable radial cylinder assembly is driven for rotation about a ported valve spindle incorporating suction and outlet ports, a plunger being reciprocable in each radial cylinder and having at its outer end an anti-friction device (hereinafter referred to as a "slipper") which is located on the plunger by a pin or equivalent extending transversely through the plunger, and the slipper operating against a stationary track ring the eccentricity of which in relation to the rotating cylinder assembly determines the operating stroke of the plungers. Such a pump is hereinafter designated "a pump of the kind hereinbefore specified." A pump of this kind is disclosed in my copending application Serial No. 794,684, filed December 30, 1947.

The invention is concerned more particularly with the mounting of the slippers and has been devised with a view to providing a pump of the kind hereinbefore specified which is of improved construction, being durable and operating satisfactorily at high pressures on petrol, paraffin, or other liquid having low or negligible lubricating properties, and to this end and in accordance with the invention in the form herein shown the working loads (thrust) are transmitted between each pin or equivalent and plunger through a universal element which is received within a socket in the plunger and permits the slipper and pin to rock at least transversely of the plane of rotation of the plunger, and preferably also in that plane, and thus permits the slipper to accommodate itself to track mal-alignment to relieve the pin and plunger of uneven loads that might otherwise occur.

In a convenient structural design the universal elements may be made by forming a channel of curved cross section in the surface of a thrust element in the form of a ball, the channel extending transversely of the plane of rotation and fitting around part of the pin, and the ball fitting the socket in the plunger. The transversely extending pin, connected at its ends to the slipper, will tilt with the slipper as inequalities in the track ring cause the slipper to tilt transversely of the plane of rotation; in turn the pin will rock the thrust element, the ball, transversely of the plane of rotation, and will itself shift bodily lengthwise of the channel of the ball wherein the pin seats. The pin also may rock within its channel, in the plane of rotation. The ball, as already stated, will rock transversely of the plane of rotation, and likewise may rock in the plane of rotation, although the rocking of the pin in that plane would suffice.

The holes or slots through which the ends of the pins or equivalent extend are preferably such as to embrace the pins so that outward plunger travel during suction strokes may be assisted by the centrifugal action of the slippers.

Provision may also be made for lubricating the rubbing surfaces between the plunger and universal element and between the universal element and pin. For this purpose the plunger may be formed with a passage for lubricant, and a registering passage for lubricant may be formed in the universal element. The passage in the plunger may extend from its working face so that lubricant will be forced through the passages during delivery strokes, or alternatively the passage in the plunger may lead from the cylindrical surface of the plunger, and a duct for the supply of lubricant may lead to the cylindrical wall of the plunger-housing, the arrangement being such that during reciprocation of the plunger the passage in the plunger will move past the duct in the plunger-housing and thus temporarily register to permit lubricant to pass along the passages during each stroke of the plunger.

It is preferred to make each slipper-mounting pin nonrotatable with respect to its slipper in order that the rubbing surface on the pin will extend over a reasonably large area which is available in the channel in the universal element. In addition to relieving the pin and plunger of uneven loads, the universal element enables a satisfactory choice of materials to be made; thus the pin and plunger may be made from materials suitable for performing their functions whilst the universal element may be made of a material which will suitably combine with those of the plunger and pin in providing a suitable bearing which will be resistant to wear.

In order that the invention may be more clearly understood and readily carried into effect, one pump embodying the invention will now be described by way of example with reference to the accompanying drawings of which:

Figure 1 is a sectional side elevation on the line I—I in Figure 2;

Figure 2 is a sectional end elevation on the line II—II in Figure 1; and

Figures 3 and 4 illustrate in section details of Figures 1 and 2 respectively.

The pump about to be described has been devised more particularly for use in supplying fuel to the burners of a continuous combustion turbine engine. The fuel supplied will usually have little or negligible lubricating properties and the pump will be called upon to deliver the fuel at a considerable rate and pressure entailing inevitably minimum working clearances between the moving parts more particularly between the plungers and their bores. It therefore becomes of great importance to relieve the plungers of uneven loads, or indeed, of every load, that might lead to scoring or even to seizure.

The pump shown is of the kind hereinbefore specified and incorporates the known practice of feeding the liquid to be pumped first into the casing of the pump so as to immerse the rotating cylinder assembly and the slippers, the incoming liquid being delivered into the casing through a primary inlet port nearer the centre than the primary outlet port which feeds the liquid to the suction port of the valve spindle and thence to the rotating cylinder assembly. In this way boost pressure is applied against the suction port of the valve spindle.

The pump has a stationary casing 11 to which is secured eccentrically by bolts 12 a ported valve spindle 13 having suction and outlet ports 14 and 15 respectively. A radial cylinder assembly 16 having seven or other desired number of cylinder bores 20 is driven to rotate about the valve spindle 13 by a drive shaft 17 which is suitably coupled to the cylinder assembly, for instance, by a dog clutch 18. A plunger 19 is reciprocable in each radial cylinder 20 and has at its outer end a slipper bearing member 21 which operates on the principle of a Michel pad bearing with respect to a stationary track ring 22 secured in the casing 11. The stroke of the plungers 19 is determined by the eccentricity of the track ring 22 in relation to the axis of the valve spindle 13. The liquid is supplied through a primary inlet port (not shown) leading into the space within the casing 11 somewhere near the inner part of the cylinder assembly. The incoming liquid is centrifuged outwardly towards the track ring 22 to pass through a primary outlet port 23 in the track ring 22 whence it is transferred through a transfer passage 24 into the suction port 14. The outward movements of the plungers as they revolve across the suction port 14 suck the liquid into the corresponding cylinders and eventually discharge the liquid into the outlet port 15 from which it passes into a supply conduit (not shown). The cylinder assembly rotates in the direction indicated by the arrow 25 in Figure 2.

The track ring 22 has two axially spaced track surfaces 26 and 27 which are engaged by corresponding surfaces on the slippers 21. These track surfaces lie at appreciable distances, or have appreciable breadth, in the axial direction, and lie generally equally at the opposite sides of a median plane or plane of rotation which is defined by the radial axes of the several cylinders 20. The clearances of all parts of the pump are extremely small, for the pressures developed are high, and the rate of delivery is high, yet since the fluid handled has negligible lubricating qualities, the working loads are high, and departures from precision in the working parts—whether due to the impossibility of exactly duplicating two pieces of mechanism, or from normal wear, or from deformation under load—any of which in a pump of less exacting requirements would normally be negligible, in such a pump as this become magnified in their effect, and progressively destructive, must be compensated for and minimized in every possible manner.

Now if it be remembered that unevenness in these paired track surfaces 26 and 27, such that the slipper tends to tilt in the axial direction (that is to say, transversely of the plane of rotation), would cause a tendency for the corresponding plunger 19 to cock and stick in its radial bore 20, were the slipper connected in any wise rigidly to the plunger, and especially if the rigidity of connection were in the axial direction even though it were otherwise nonrigid, and if it be remembered further that the tendency to cock and stick originating at the axially extending track surfaces 26 and 27, is magnified the farther, radially, from those surfaces is located the point of rigid connection to the plunger, it becomes clear that (a) complete independence of movement between the slipper and plunger, for relative tilting transversely of the plane of rotation, is practically essential in a pump of this nature, and that (b) a minimum moment arm between the point of origination of tilting (at the circles of the track surfaces 26 and 27) and the point of application of the tilting force to the plunger 19 (the center of the ball 36 hereinafter described) is highly desirable in such a pump.

The connection chosen comprises a truly universal joint, rockable both within and transversely of the plane of rotation, and centered as nearly as is feasible in the vicinity of the track surfaces, and medially of their breadth. This connection closely approaches the ideal, and very greatly minimizes side thrust on the plungers.

Each slipper 21 has a pair of inwardly extending lugs 28 which are apertured to receive a gudgeon pin 29 (see Figure 3). The pin 29 has a head 30 formed with a flat which fits against the inner surface 31 of the slipper (see Figure 3), the pin being retained in position by split pin 32. Each plunger 19 is formed from its outer end with a cylindrical bore 33 which terminates as a hemispherical socket 34 and the wall of the plunger at the outer side of the socket 34 is formed with diametrically opposite holes 35 which are elongated axially of the plunger. Each socket 34 receives as a rubbing fit a ball-like universal element 36 which also fits around part of the surface of the pin 29. The element is made by forming a channel of curved cross section in the surface of a ball. The elongation of the holes 35 together with the universal element 36 permits the slipper 21 and pin 29 to tilt in a direction transverse of the plane of rotation of the plungers so that the slippers 21 can accommodate themselves to track malalignment which would otherwise impose uneven transverse loads on the plungers which, however slight, would interfere with the satisfactory operation of the pump, particularly in view of the conditions in which the pump has to operate. The holes 35 leave material of the slipper extending over the gudgeon pins 29 so that during suction strokes i. e. during outward travel of the plungers, the plungers may be assisted in their movement by the centrifugal action of the slippers. This remains true even though the holes 35 may be formed as undercut slots. This is not essential because in basic design the centrifugal action of the plungers will usually be equal to or greater than that of the corresponding slippers.

It is desirable to maintain the rubbing surfaces of the universal elements 36 moistened or lubricated and for this purpose the liquid being pumped may be fed to such surfaces, or alternatively other liquid chosen for its lubricating properties may be fed to the surfaces. In the former case all that is necessary is, for each plunger 19 to be formed with a passage extending from its working face 37 to the socket 34 and to provide in the universal element 36 a registering passage which extends through the universal element to open against the co-operating surface of the gudgeon pin 29. It will be seen that during delivery strokes i. e. during inward travel of the plungers, some of the liquid will be forced through the passages, tending to separate the rubbing surfaces between the plunger and universal element and between the universal element and gudgeon pin. However it is preferred to arrange a passage such as the passage 38 in the plunger so that it opens at the cylindrical wall of the plunger and to provide in the cylinder assembly a passage 39 which leads from the cylindrical wall of the plunger-housing to one of the pressurised channels 40 usually formed around the valve spindle 13. In such an arrangement liquid in the passage 39 will always be at pump delivery pressure and some of the liquid will be able to reach the rubbing surfaces through the passage 38 in the plunger and through the registering passage 41 in the universal element 36 whenever the passage 38 moves past the passage 39. When it is desired to supply a special lubricant to the rubbing surfaces the arrangement may be similar to that just described except that the passage 39, instead of leading to a pressurised channel containing liquid being pumped, will lead to a supply of lubricant which may in fact reach the passage 39 through a pressurised channel in the valve spindle. It will be understood that the features of the invention may be used in conjunction with other features designed from other points of view to improve the running of the pump, which features are not herein described as they form no part of the present invention.

I claim:

1. In a pump of the type which comprises a substantially circular track ring of appreciable breadth in the axial direction, a radially bored cylinder assembly rotative in a plane generally medially disposed relative to the breadth of the track ring about an axis eccentric to the track ring's axis, a plunger reciprocable in each bore and having an opening near its outer end, the inner wall whereof is rounded transversely of such plane of rotation, and a slipper corresponding to and operatively connected to each plunger and having guiding engagement with said track ring: said operative connection comprising a thrust element seated in said plunger's opening and rounded complementally thereto to rock transversely of the plane of rotation, an elongated member extending transversely of the plane of rotation, said elongated member and said thrust element being complementally formed and engaged to define a bearing seat upon said thrust element whereby said elongated member will rock bodily with the thrust element transversely of the plane of rotation, and may shift relative to the latter in so doing in the direction of its own length, and also to rock relative to said thrust element in the plane of rotation, said elongated member being operatively connected to the slipper at opposite sides of said thrust element to rock bodily with the slipper transversely of the plane of rotation and thereby similarly to rock the thrust element in its seat in the plunger's opening.

2. A pump as set forth in claim 1, wherein the opening near the outer end of the plunger is a hemispherically shaped socket, and the thrust element is formed as a universal ball seated in said hemispherical socket, and rockable therein in the plane of rotation as well as transversely thereto.

3. A pump as set forth in claim 2, wherein the elongated member connecting the universal ball and the slipper comprises a pin disposed transversely of the plane of rotation, and secured in the slipper but tiltable relative to the plunger, the ball-like universal element being channeled transversely of the plane of rotation to receive said pin snugly, and by its own rocking in its socket permitting tilting of the slipper relative to the plunger.

4. A pump as set forth in claim 3, including a passage formed in the plunger and leading from a pressurized pump space to the ball socket, and a registering passage in the universal ball terminating in the pin-receiving channel.

5. A pump as set forth in claim 4, wherein the inlet to the plunger's passage lies in the plunger's wall, the cylinder assembly having a passage leading from a pressurized pump space and terminating in each bore in position to register, during the plunger's stroke, with the inlet to the plunger's passage.

6. A pump as set forth in claim 1, wherein the opening near the outer end of the plunger is a hemispherically shaped socket, and the thrust element is formed as a universal ball seated in said hemispherical socket, and rockable therein in the plane of rotation as well as transversely thereto, and the elongated member connecting the universal ball and the slipper comprises a pin the ends whereof are received snugly in the slipper, the universal ball being channeled to snugly receive and rock with said pin transversely of the plane of rotation, and the plunger being formed with apertures elongated lengthwise of the plunger for passage of the ends of the pins, and to permit their tilting.

FREDERICK HENRY CAREY.

REFERENCES CITED

The following references are of record in the file of this patent:

UNITED STATES PATENTS

| Number | Name | Date |
| --- | --- | --- |
| 374,331 | Adams | Dec. 6, 1887 |
| 622,318 | Almond | Apr. 4, 1899 |
| 1,325,434 | Carey et al. | Dec. 16, 1919 |
| 2,130,299 | Ernst | Sept. 13, 1938 |
| 2,227,631 | Carter | Jan. 7, 1941 |
| 2,392,754 | Mercier | Jan. 8, 1946 |
| 2,427,325 | Ferris | Sept. 9, 1947 |
| 2,431,175 | Hoffer | Nov. 18, 1947 |

FOREIGN PATENTS

| Number | Country | Date |
| --- | --- | --- |
| 745,216 | France | 1933 |